United States Patent [19]

Capelle et al.

[11] Patent Number: 4,719,803
[45] Date of Patent: Jan. 19, 1988

[54] BOREHOLE EXTENSOMETER FOR MONITORING RELATIVE MASS DISPLACEMENTS

[75] Inventors: Jean-François Capelle, St-Lambert; Raoul Leroux, Boucherville; Gérard Theroue, Brossard, all of Canada

[73] Assignee: Roctest Ltee/Ltd., St. Lambert, Canada

[21] Appl. No.: 40,104

[22] Filed: Apr. 20, 1987

[51] Int. Cl.[4] ........................................... G01N 33/24
[52] U.S. Cl. ..................................................... 73/784
[58] Field of Search ........................ 73/784, 783, 151; 340/690

[56] References Cited

U.S. PATENT DOCUMENTS

| | | | |
|---|---|---|---|
| 2,646,680 | 7/1953 | Steele et al. | 73/151 |
| 3,404,460 | 10/1968 | Livingston et al. | 73/784 |
| 3,416,230 | 12/1968 | Oleson et al. | 73/784 |
| 3,483,745 | 12/1969 | Ublacker | 73/784 |
| 3,562,916 | 2/1971 | Duckworth | 73/784 |
| 4,001,942 | 1/1977 | Schuermann et al. | 73/784 |
| 4,207,765 | 6/1980 | Kiff | 73/151 |
| 4,242,915 | 1/1981 | Herman, III | 73/784 |

Primary Examiner—Stewart J. Levy
Assistant Examiner—Robert R. Raevis
Attorney, Agent, or Firm—Charles E. Brown; Charles A. Brown

[57] ABSTRACT

A device positionable in a borehole for monitoring relative mass displacements axially along the borehole between at least two spaced-apart anchor points, comprises at least two retrievable anchor members arranged in spaced-apart opposite relationship to define the at least two anchor points, the anchor members each having radially displaceable borehole wall contacting means and including mechanical means for radially outwardly displacing the borehole wall contacting means to engage the borehole wall and thereby fix the anchor member in the borehole against the wall thereof. A linear displacement sensing means is arranged between the anchor members, the displacement sensing means being connected to one of the anchor members and including an elongated axially movable sensor element, the sensor element being normally biased in a direction toward the other anchor member for contact engagement therewith. Relative mass displacements are transmitted to the sensor element and are measured by the displacement sensing means as a variation in distance between the anchor members within the borehole.

14 Claims, 5 Drawing Figures

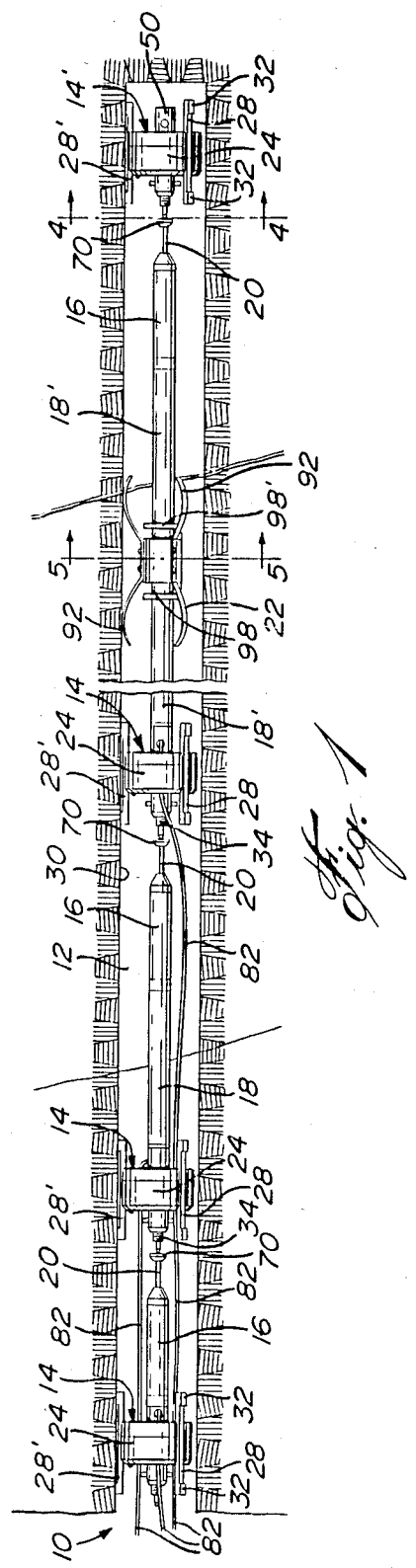
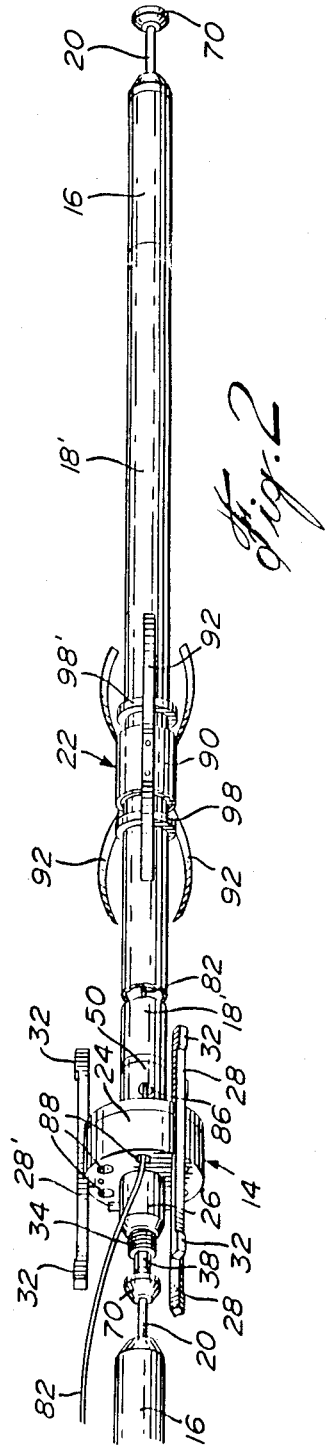

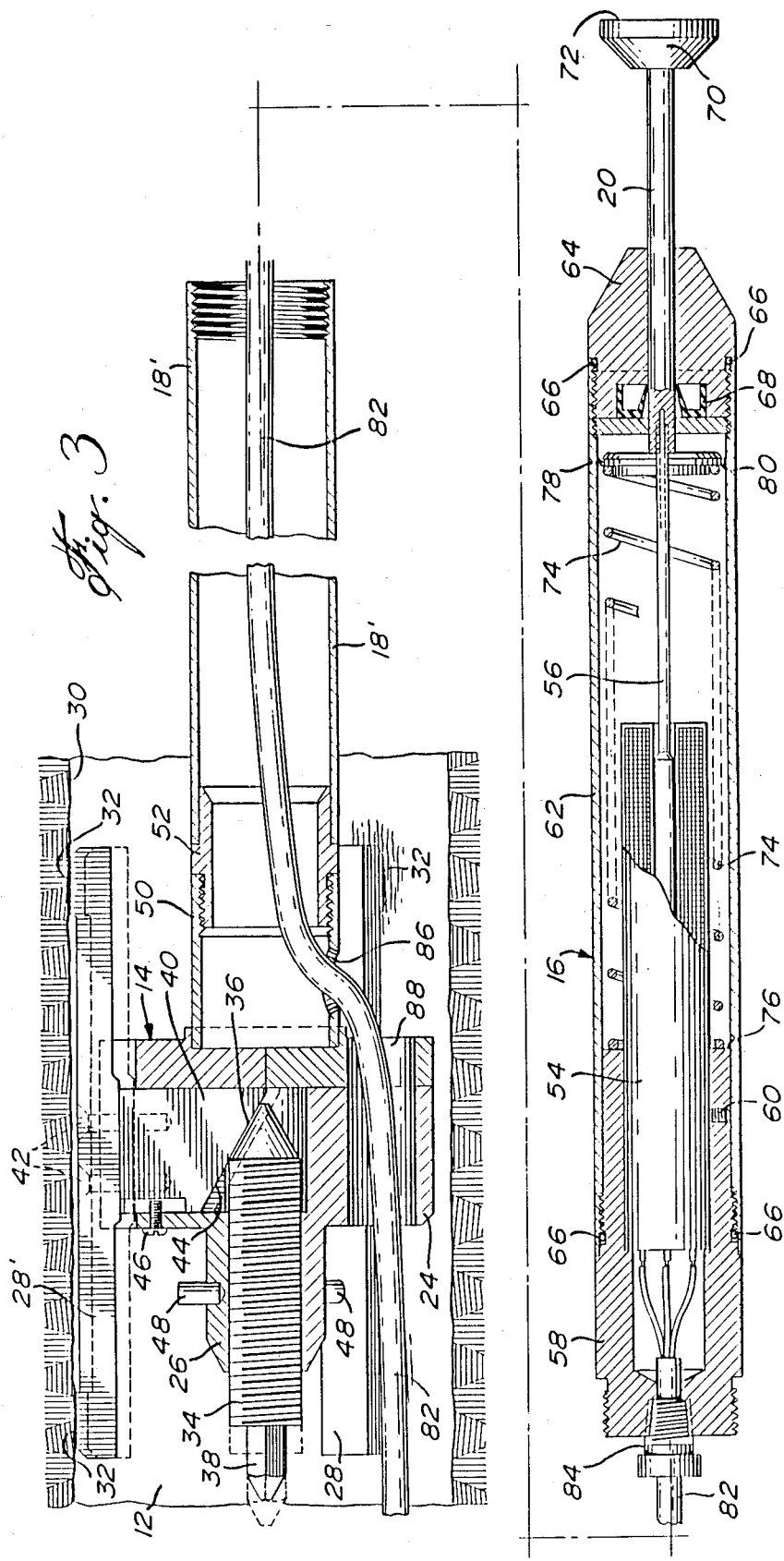

BOREHOLE EXTENSOMETER FOR MONITORING RELATIVE MASS DISPLACEMENTS

BACKGROUND OF THE INVENTION

The present invention relates to improvements in the field of borehold extensometry. More particularly, the invention is concerned with an improved borehole extensometer for monitoring relative mass displacements.

Borehole extensometers are instruments generally used to measure rock movements that may take place as a result of surface and underground excavation, foundation loading, movement of natural slopes, etc. The relative displacements of the rock are measured at various depths in a borehole and these displacement measurements allow to determine the relative stability of the rock surrounding the opening, to define those zones which are being compressed or put in tension and to possibly delineate the destressed volume of rock created by the excavation itself.

A borehold extensometer typically comprises three main components: a displacement sensor, one or more anchors at various depths in the borehole and rods or wires each interconnecting a respective anchor with the displacement sensor. The displacement sensor is usually mounted inside a reference head located at the borehole collar and can be designed for either electrical or mechanical readout. The relative displacements of the rock, as transmitted to the rods or wires, are measured by the displacement sensor as a change in the distance between an anchor within the borehole and the reference head at the borehole collar.

A borehole extensometer consisting of a single anchor and a rod or wire extending between the anchor and the reference head is termed "single-position borehole extensometer". Extensometers with a plurality of anchors within the rock are termed "multiple-position borehole extensometers" and are preferred for measuring rock movements since the variation of displacement with depth can be determined.

As the displacement sensor is located in a head assembly protruding from the collar of the borehole, it can be easily damaged, for instance by moving trucks, especially in mining areas. Even if fixed by rock bolts or grout at the borehole collar, the extensometer head is generally not sufficiently stable to blast vibrations and can thus be displaced by violent shock waves created by blasting, resulting in erroneous measurements.

Moreover, since a rod or wire extending between each anchor within the borehole and the reference head at the borehole collar is used to transmit to the sensor the relative displacement of the anchor caused by rock movement, long rod- or wire-type installations usally suffer from a lack of instrument precision due to unavoidable friction in such installations. In long vertical holes, buckling of the rods and excessive weight may also cause problems.

SUMMARY OF THE INVENTION

It is therefore an object of the present invention to overcome the above drawbacks and to provide an improved borehole extensometer which does not require a surface reference head and is capable of providing in-bore-hole displacement measurements.

It is a further object of the invention to provide such a borehole extensometer which also features adequate mechanical stability to blast vibrations, easy installation and complete retrievability as well as high accuracy.

In accordance with the invention, there is provided a device positionable in a borehole for monitoring relative mass displacements axially along the borehole between at least two spaced-apart anchor points, which device comprises at least two retrievable anchor members arranged in spaced-apart opposite relationship to define the at least two anchor points, the anchor members each having radially displaceable borehole wall contacting means and including mechanical means for radially outwardly displacing the borehole wall contacting means to engage the borehole wall and thereby fix the anchor member in the borehole against the wall thereof. A linear displacement sensing means is arranged between the anchor members, the displacement sensing means being connected to one of the anchor members and including an elongated axially movable sensor element, the sensor element being normally biased in a direction toward the other anchor member for contact engagement therewith. Relative mass displacements are transmitted to the sensor element and are measured by the displacement sensing means as a variation in distance between the anchor members within the borehole.

Thus, according to the invention, the displacement sensing means measuring relative displacement between anchor points are located in the borehole and not in a head assembly protruding from the collar of the hole. This feature provides protection of the measuring system and consequently increases its reliablity especially in thoses cases where the device is subjected to shock waves created by blasting.

In a preferred embodiment of the monitoring device according to the invention, the anchor members each have a cylindrical body and a plurality of elongated axially extending borehole wall contacting elements are arranged circumferentially of the body in spaced relation to one another, at least one of the borehole wall contacting elements being radially displaceable. The mechanical means preferably comprise axially movable cam means arranged in the body and cam follower means connected to the radially displaceable borehole wall contacting element and cooperable with the cam means upon movement thereof for radially outwardly displacing the element to engage the borehole wall. The anchoring capacity of such mechanical anchor members is very high and the borehole wall contacting elements are designed to adjust to small deformations of the borehole while still exerting the necessary anchoring force. The use of such anchor members also allows for a complete retrievability of the monitoring device according to the invention.

Accordingly, the present invention also provides in another aspect thereof an anchor member positionable in a borehole for defining an anchor point, comprising a cylindrical body; a plurality of elongated axially extending borehole wall contacting elements arranged circumferentially of the body in spaced relation to one another, at least one of the borehole wall contacting elements being radially displaceable; axially movable cam means arranged in the body; and cam follower means connected to the at least one borehole wall contacting element and cooperable with the cam means upon movement thereof for radially outwardly displacing the one element to engage the borehole wall and thereby fix the anchor member in the borehole against the wall thereof.

The anchor member according to the invention preferably comprises three borehole wall contacting elements, one of the elements being radially displaceable and the other two being fixed. Each borehole wall contacting element is advantageously provided with two spaced-apart borehole wall contact surfaces arranged adjacent opposite ends of each element. The radially displaceable element is connected intermediate the ends thereof to the cam follower means whereas the two other elements are fixed intermediate the ends thereof to the body and are disposed relative to the displaceable element such that movement of the cam means to radially outwardly displace the latter element causes all three elements to be resiliently urged against the borehole wall, thereby providing positive engagement of the contact surfaces with the borehole wall. The borehole wall contacting elements therefore lock the anchor member to the borehole wall to prevent anchor slippage due to blast vibrations.

According to a preferred embodiment, the cam means comprises a spindle having a tapered end defining a cam surface and the cam follower means comprises an arm slidably mounted in the body for radial movement, the arm being connected at one end to the displaceable borehole wall contacting element and being formed at the other end with a sloped surface engaging the cam surface. Thus, axial inward movement of the spindle causes the arm to move radially outwardly and thereby displace the element to engage the borehole wall. Preferably, the spindle is threadably engaged in the body for rotation about its longitudinal axis such that rotation of the spindle in one direction causes the spindle to move axially inwardly of the body and the arm to move radially outwardly, thereby engaging the displaceable element with the borehole wall. Reversing the direction of rotation of the spindle causes the spindle to move axially outwardly of the body and the arm to move radially inwardly, thereby disengaging the element from the borehole wall.

In the monitoring device according to the invention, the sensor element preferably extends substantially centrally of the borehole and is provided at a free end thereof with an enlarged head for contact engagement with a portion of the spindle which is opposite the tapered end and protrudes from the body of the other anchor member. The provision of an enlarged head at the free end of the sensor element enables the sensor element to remain in contact engagement with the spindle of the other anchor member in those cases where mass displacements created by shear forces are transverse to the longitudinal axis of the sensor element. Thus, the monitoring device according to the invention still remains operative for measuring the axial component of such mass displacements.

The displacement sensing means can be electrical, mechanical, optical or acoustic, but is preferably of the electrical type and mounted in a watertight housing connected to one of the anchor members, the sensor element extending through the housing for contact engagement with the other anchor member. Such electrical displacement sensing means preferably comprises a linear voltage displacement transducer having a slidable core rod coupled with the sensor element.

In a particularly preferred embodiment, the monitoring device includes a plurality of anchor members arranged in spaced relation to one another to define multiple anchoring points, and linear displacement sensing means arranged between two successive anchor members for providing multiple point displacement monitoring. Displacement measurements are thus made in the borehole, in sections distributed along the borehole length.

According to yet another preferred embodiment, the displacement sensing means are detachably connected to the anchor members to define a plurality of modular displacement sensing units each associated with a respective one of the anchor members. Due to such modular assembly, it is possible to choose the displacement sensing unit in each measuring section to match the scale of the displacement expected along the borehole. The result is an optimization of sensitivity at each measuring point along the borehole.

The device according to the invention can be used not only for rock slope stability monitoring and rock displacement measurements around tunnels and shafts, but also for the monitoring of underground vaults for nuclear waste disposal and for stability assessment of internal cracks in concrete dams.

BRIEF DESCRIPTION OF THE DRAWINGS

Further features and advantages of the invention will become more readily apparent from the following description of preferred embodiments as illustrated by way of example in the accompanying drawings, in which:

FIG. 1 is a side view of a monitoring device or extensometer according to the invention, seen installed in a borehole;

FIG. 2 is a fragmentary perspective view of the extensometer illustrated in FIG. 1;

FIG. 3 is a fragmentary longitudinal section view of the extensometer;

DESCRIPTION OF PREFERRED EMBODIMENTS

Figure 4:
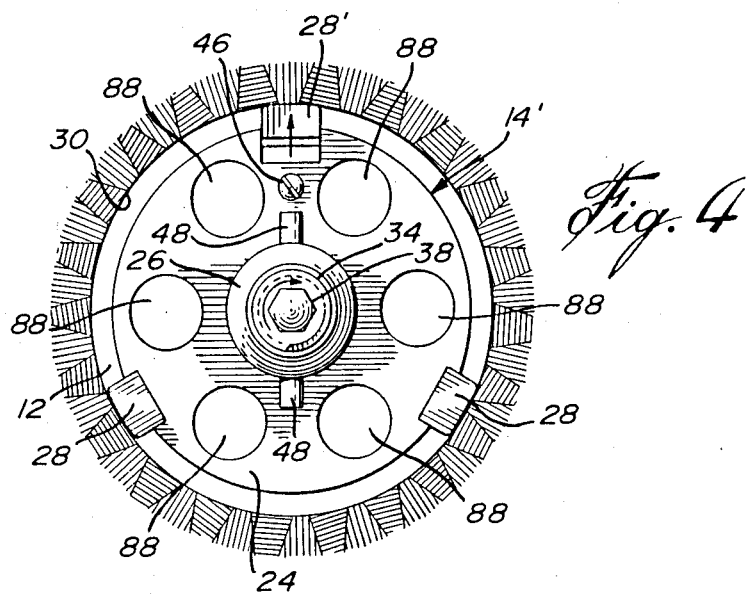
FIG. 4 is a sectional view taken along line 4—4 of FIG. 1.

Referring first to FIG. 1, there is illustrated a multiple point borehole extensometer generally designed by reference numberal 10 and seen installed in a borehole 12. The extensometer 10 comprises a plurality of mechanical anchor members 14 arranged in spaced relation to one another to define multiple anchoring points, the innermost anchor member 14' defining a bottom anchor. The extensometer also comprises a plurality of linear displacement sensing modules 16 each arranged between two successive anchor members. The displacement sensing modules 16 are connected either directly to the anchor members 14 or indirectly thereto by means of extension tubes 18,18' of varying lengths. As shown, each displacement sensing module 16 extends substantially centrally of the borehole 12 and has an axially movable sensor rod 20 normally biased in a direction toward an opposed anchor member for contact engagement therewith. Relative mass displacements are thus transmitted to the sensor rods 20 and are measured by the displacement sensing modules 16 as a variation in distance between the anchor members 14,14' within the borehole 12. Displacement measurements are therefore made in the borehole, in sections distributed along the borehole length. Where a relatively long extension tube 18' is interconnected between an anchor member 14 and a displacement sensing module 16, a centralizer 22 is mounted over the tube to prevent its sagging, the centralizer 22 receiving the extension tube 18' in sliding engagement therethrough.

As shown in FIGS. 2, 3 and 4, the anchor members 14,14' each have a cylindrical body 24 formed with a collar 26 and comprise three axially extending shoes 28,28' adapted to contact the borehole wall 30 and arranged circumferentially of the body 24 in equidistantly spaced relation to one another, the shoe 28' being radially displaceable and the two other shoes 28 being fixed to the body 24. The shoes 28,28' are each provided with two spaced-apart borehole wall contact surfaces 32 arranged at the ends of each shoe.

The anchor members 14,14' further include mechanical means for radially outwardly displacing the shoe 28' to engage the borehole wall 30 and thereby fix the anchor member in the borehole 12. Such mechanical means comprise a spindle 34 having a tapered end defining a cam surface 36 and formed at the other end with a pin 38 of hexagonal cross-section, the spindle 34 being threadably engaged in the collar 26 for rotation and axial movement, and an arm 40 slidably mounted in the body 24 for radial movement, the arm 40 fixedly holding the shoe 28' by means of screws 42 and being formed with a sloped surface 44 engaging the cam surface 36. Thus, clockwise rotation of the spindle 34 causes the spindle to move axially inwardly of the body 24 and the arm 40 to move radially outwardly, thereby engaging the shoe 28' with the borehole wall 30. Radial outward movement of the arm 40 is limited by a screw 46 acting as a stop. Since the shoes 28,28' are provided with spaced-apart contact surfaces 32 and are connected intermediate their ends to the body 24 and arm 40, all three shoes can be resiliently urged against the borehole wall 30 by foreably rotating the spindle 34, thereby providing positive engagement of the contact surfaces 32 with the borehole wall 30. Reversing the direction of rotation of the spindle 34 causes the spindle to move axially outwardly of the body 24 and the arm 40 to move radially inwardly, thereby disengaging the shoe 28' from the borehole wall 30. The arm 40 therefore acts as a cam follower cooperating with the spindle 34 upon movement thereof to radially displace the shoe 28'.

The anchor members 14,14' are also provided with dowell pins 48 which are press-fitted into the collar 26 and serve for coupling the anchor members to an installation tool (not shown). A tubular coupling element 50 extends from the body 24 centrally thereof for connection to either a displacement sensing module 16 or to an extension tube 18 or 18'. As shown in FIG. 3, the extension tube 18' is provided at its connecting end with a threaded insert 52 which is welded to the tube and threadably engages the coupling element 50; the extension tube 18 shown in FIG. 1 is similarly provided with such a threaded insert. In the case of the bottom anchor member 14', the tubular coupling element 50 can of course be omitted.

The displacement sensing module 16 comprises a linear voltage displacement transducer (LVDT) 54 having a slidable core rod 56 coupled with the sensor rod 20; a linear potentiometer can of course be used instead of a LVDT. The transducer 54 is secured to a support 58 by means of a screw 60 and is mounted in a watertight housing 62 closed with a nozzle 64, seal rings 66 being provided between the housing 62 and the support 58 and nozzle 64. The sensor rod 20 sealingly extends through the nozzle 64, sealing being achieved by means of a seal member 68 arranged in the nozzle 64. As best shown in FIG. 2, the sensor rod 20 is provided at its free end with an enlarged head 70 having a flat surface 72 for contact engagement with the spindle 34 of an opposed anchor member 14. A helicoidal spring 74 is arranged in the housing 62 for normally biasing the sensor rod 20 outwardly, the spring 74 abutting the shoulder 76 and acting on a disk 78 secured to the sensor rod; the disk 78 is formed with an annular recess 80 for seatingly receiving the spring 74. A multi-conductor cable 82 electrically connects the transducer 54 to a remote readout unit (not shown), the electrical cable 82 being connected to the displacement sensing module by means of a watertight plug 84. As shown in FIG. 3, the electrical cable 82 passes through the extension tube 18' to extend through an aperture 86 formed in the coupling element 50 of the anchor member 14, and then through one of six axial holes 88 formed in the anchor member.

Figure 5:
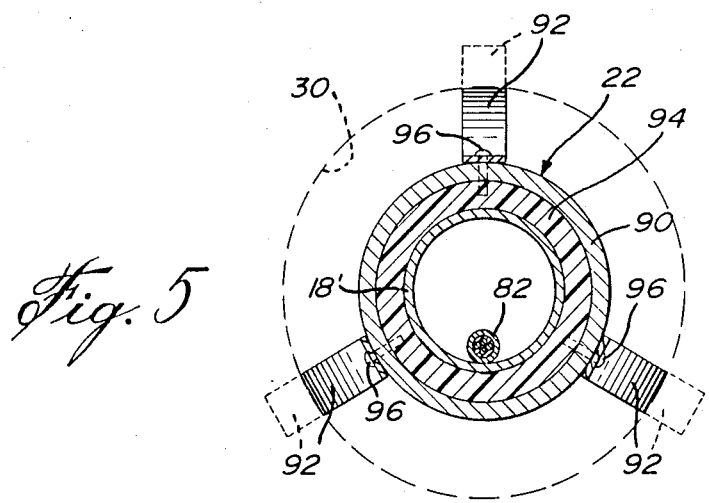
FIG. 5 is a sectional view taken along line 5—5 of FIG. 1.

The centralizer 22 which is used to maintain the central positioning of the extension tube 18' within the borehole 12 comprises a cylindrical guide sleeve 90 receeving the tube 18' in sliding engagement, and three axially extending resilient blade elements 92 arranged circumferentially of the guide sleeve 90 in equidistantly spaced relation to one another. The blade elements 92 are resiliently urged into contact engagement with the borehole wall 30 to position the guide sleeve 90 substantially centrally of the borehole 12. In order to minimize friction between the guide sleeve 90 and the extension tube 18', a cylindrical bearing 94 of TEFLON (trade mark) is arranged therebetween, as best shown in FIG. 5. The screws 96 which secure the blade elements 92 to the guide sleeve 90 are also used to fix the inner TEFLON bearing 94. A pair of stop rings 98,98' are secured to the extension tube 18' on either side of the centralizer 22 in spaced relation thereof; the stop ring 98 is used to properly position the centralizer 22 during installation of the extensometer 10 in the borehole 12 whereas the stop ring 98' is used for retrieving the centralizer 22 together with the extensometer.

The installation procedure of the extensometer 10 is simple and straightforward due to the modular design of the instrument. Having previously established the anchor points, the bottom anchor member 14' is first installed, it is mounted on and locked, by means of the dowell pins 48, to an installation tool (not shown) consisting of a hollow tube and then pushed in the borehole 12 to the desired location. To fix the anchor member 14' against the borehole wall, an inner setting rod having at the end thereof a hexagonal socket is inserted in the installation tube such that the hexagonal socket fits onto the hexagonal pin 38 of the anchor member. Holding the external tube, the inner rod is rotated clockwise to rotate the spindle 34 and thus radially outwardly displace the shoe 28' until it contacts the borehole wall 30. The inner setting rod is further tightened to provide a strong anchoring. The external tube is unlocked from the anchor member by turning counterclockwise and it is withdrawn from the borehole 12 together with inner setting rod.

The next step consists in mounting a displacement sensing module 16 on the length of extension tube 18 required to provide the necessary spacing between the lower and upper anchor points of the monitoring section. In doing so, the electrical cable 82 of the module 16 is either passed through each additional length of extension tube or is left along its side. If required, centralizers 22 are also mounted on the extension tube at regular intervals. Following the same procedure as described above for installing the bottom anchor member 14', the next or upper anchor member 14 is mounted and locked to the installation tool and the whole assembly consisting of the anchor member 14, displacement sensing module 16 and extension tube 18 therebetween is pushed in the borehole 12 until the sensor rod 20 of the module 16 makes contact with the lower anchor member 14'.

The electrical cable 82 of the module 16 is then connected to a portable readout unit (not shown). While checking the display of the readout unit, the external setting tube is pushed slightly until the transducer 54 is positioned correctly within its operating range. When this position is reached, the inner setting rod is rotated clockwise to tighten the upper anchor member 14 solidly in the borehole 12. The external setting tube is unlocked and withdrawn together with the inner setting rod, leaving the deepest monitoring section fully installed in the hole. The procedure is repeated for all the subsequent monitoring sections up to the collar of the borehole, taking care of passing all the electrical cables 82 through the holes 88 provided in the anchor members 14 as the installation progresses. Complete retrieval of the extensometer 10 can be done following the reverse procedure.

Depending on the operating range of the transducer 54 used, the extensometer 10 can measure relative mass displacements as small as 0.001 mm (0.00004 inch) with a stability of the same order.

We claim:

1. A device positionable in a borehole for monitoring relative mass displacements axially along the borehole between at least two spaced-apart anchor points, said device comprising:
   at least two retrievable anchor members arranged in spaced-apart opposite relationship to define said at least two anchor points, said anchor members each having radially displaceable borehole wall contacting means and including mechanical means for radially outwardly displacing said borehole wall contacting means to engage the borehole wall and thereby fix the anchor member in said borehole against the wall thereof; and
   linear displacement sensing means arranged between said anchor members, said displacement sensing means being connected to one of said anchor members and including an elongated axially movable sensor element, said sensor element being normally biased in a direction toward the other anchor member for contact engagement therewith, whereby relative mass displacements are transmitted to said sensor element and are measured by said displacement sensing means as a variation in distance between said anchor members within said borehole.

2. A monitoring device as claimed in claim 1, wherein said anchor members each have a cylindrical body and wherein a plurality of elongated axially extending borehole wall contacting elements are arranged circumferentially of said body in spaced relation to one another, at least one of said borehole wall contacting elements being radially displaceable.

3. A monitoring device as claimed in claim 2, wherein each anchor member is provided with three borehole wall contacting elements, one of said elements being radially displaceable and the other two being fixed.

4. A monitoring device as claimed in claim 3, wherein each borehole wall contacting element is provided with two spaced-apart borehole wall contact surfaces arranged adjacent opposite ends of each said element, and wherein said one element is connected intermediate the ends thereof to said mechanical means and said two other elements are fixed intermediate the ends thereof to said body and are disposed relative to said one element such that actuation of said mechanical means to radially outwardly displace said one element causes all said three elements to be resiliently urged against the borehole wall, thereby providing positive engagement of said contact surfaces with said borehole wall.

5. A monitoring device as claimed in claim 2, wherein said mechanical means comprise axially movable cam means arranged in said body and cam follower means connected to said at least one borehole wall contacting element and cooperable with said cam means upon movement thereof for radially outwardly displacing said one element to engage said borehole wall.

6. A monitoring device as claimed in claim 5, wherein said cam means comprises a spindle having a tapered end defining a cam surface and wherein said cam follower means comprises an arm slidably mounted in said body for radial movement, said arm being connected at one end to said one borehole wall contacting element and being formed at the other end with a sloped surface engaging said cam surface, whereby axial inward movement of said spindle causes said arm to move radially outwardly and thereby displace said one element to engage said borehole wall.

7. A monitoring device as claimed in claim 6, wherein said sensor element extends substantially centrally of said borehole and is provided at a free end thereof with an enlarged head for contact engagement with an end portion of said spindle opposite said tapered end and protruding from the body of said other anchor member.

8. A monitoring device as claimed in claim 1, wherein said displacement sensing means is electrical and is mounted in a watertight housing connected to said one anchor member, said sensor element extending through said housing substantially centrally of said borehole for contact engagement with said other anchor member.

9. A monitoring device as claimed in claim 8, wherein said electrical displacement sensing means comprises a linear voltage displacement transducer having a slidable core rod coupled with said sensor element.

10. A monitoring device as claimed in claim 8, wherein a spring means is arranged in said housing for normally biasing said sensor element in a direction toward said other anchor member.

11. A monitoring device as claimed in claim 1, including a plurality of said anchor members arranged in spaced relation to one another to define multiple anchoring points, and linear displacement sensing means arranged between two successive anchor members for providing multiple point displacement monitoring.

12. A monitoring device as claimed in claim 11, wherein said displacement sensing means are detachably connected to said anchor members to define a plurality of modular displacement sensing units each associated with a respective one of said anchor members, and wherein at least one tubular extension element is interconnected between at least one of said anchor members and an associated displacement monitoring unit to vary the distance between two successive anchor members.

13. A monitoring device as claimed in claim 12, wherein said tubular extension element extends substantially centrally of said borehole and is provided with centralizing means for maintaining the central positioning thereof in said borehole.

14. A monitoring device as claimed in claim 13, wherein said centralizing means comprise a guide sleeve receiving said tubular extension element in sliding engagement therethrough, and a plurality of axially extending resilient blade elements arranged circumferentially of said guide sleeve in spaced relation to one another, said blade elements being resiliently urged into contact engagement with said borehole wall to position said guide sleeve substantially centrally of said borehole.

* * * * *